US012666200B2

(12) United States Patent
Liu et al.

(10) Patent No.: US 12,666,200 B2
(45) Date of Patent: Jun. 23, 2026

(54) OFFSET-SOFT MOUNT FOR SPEAKER INDUCED FORCE REDUCTION

(71) Applicant: Apple Inc., Cupertino, CA (US)

(72) Inventors: Bao Liu, San Jose, CA (US); Junyi Yang, Fremont, CA (US); Yin Yuan, Santa Clara, CA (US); Zhiwei Liu, Shanghai (CN); Scott P. Porter, San Jose, CA (US); Jordi Antoni Garcia Selva, San Jose, CA (US); Kieran Poulain, San Francisco, CA (US); Yanchu Xu, San Jose, CA (US); Kang Hou, Milpitas, CA (US); Stuart M. Nevill, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 18/481,672

(22) Filed: Oct. 5, 2023

(65) Prior Publication Data

US 2025/0119683 A1 Apr. 10, 2025

(51) Int. Cl.

| | |
|---|---|
| ***H04R 1/28*** | (2006.01) |
| ***H04R 1/02*** | (2006.01) |
| ***H04R 7/04*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ........... *H04R 1/2896* (2013.01); *H04R 1/025* (2013.01); *H04R 7/04* (2013.01); *H04R 9/025* (2013.01); *H04R 9/045* (2013.01); *H04R 9/063* (2013.01)

(58) Field of Classification Search

CPC ........ H04R 1/2896; H04R 1/025; H04R 1/02; H04R 1/026; H04R 1/26; H04R 7/04; H04R 9/025; H04R 9/045; H04R 9/063; H04R 5/02; H04R 2201/403; H04R 2201/405; H04R 2201/401

USPC ................ 381/335, 336, 332, 333, 334, 182

See application file for complete search history.

(56) References Cited

U.S. PATENT DOCUMENTS

| | | | |
|---|---|---|---|
| 6,628,790 | B1 | 9/2003 | Klein |
| 9,191,747 | B2 | 11/2015 | Dodd |
| 10,110,991 | B2 | 10/2018 | Crosby et al. |
| 10,382,858 | B1 | 8/2019 | Singer et al. |
| 10,631,096 | B1 | 4/2020 | Garcia Selva et al. |
| 11,543,864 | B2 | 1/2023 | Nevill et al. |

(Continued)

*Primary Examiner* — Ahmad F. Matar
*Assistant Examiner* — Sabrina Diaz
(74) *Attorney, Agent, or Firm* — Aikin & Gallant, LLP

(57) ABSTRACT

A speaker assembly including a first speaker comprising a first diaphragm and a first voice coil movably coupled to a first magnet assembly, wherein the first diaphragm faces a first direction, the first voice coil moves along a first axis in the first direction when driven by an audio signal and the first magnet assembly is coupled to a fixed structure by a first compliant mounting member; and a second speaker laterally offset from the first speaker and including a second diaphragm and a second voice coil movably coupled to a second magnet assembly, wherein the second diaphragm faces a second direction different from the first direction, the second voice coil moves along a second axis in the second direction when driven by an audio signal and the second magnet assembly is coupled to the fixed structure by a second compliant mounting member.

19 Claims, 2 Drawing Sheets

(56) References Cited

U.S. PATENT DOCUMENTS

| | | | | |
|---|---|---|---|---|
| 2007/0098209 | A1* | 5/2007 | Setiabudi | H04R 9/063 381/420 |
| 2007/0194633 | A1* | 8/2007 | Ueda | H04R 9/025 381/396 |
| 2012/0039484 | A1 | 2/2012 | Linse et al. | |
| 2013/0195311 | A1* | 8/2013 | Sahyoun | H04R 1/2834 381/398 |
| 2014/0211963 | A1 | 7/2014 | Dodd | |
| 2014/0314249 | A1* | 10/2014 | Fincham | H04R 1/403 381/89 |
| 2015/0263776 | A1 | 9/2015 | Shyu et al. | |
| 2016/0183151 | A1 | 6/2016 | Wu | |
| 2017/0055069 | A1 | 2/2017 | Lee et al. | |
| 2018/0288522 | A1 | 10/2018 | Yamada | |
| 2025/0294292 | A1 | 9/2025 | Nevill et al. | |
| 2025/0383731 | A1 | 12/2025 | Menashof et al. | |

* cited by examiner

OFFSET-SOFT MOUNT FOR SPEAKER INDUCED FORCE REDUCTION

FIELD

This application relates generally to an offset and soft mounted speaker configuration for force reduction, more specifically a speaker configuration having multiple offset drivers that are decoupled from a device enclosure using soft mount methods. Other aspects are also described and claimed.

BACKGROUND

Electronic devices sometimes include a pair of loudspeakers to generate sound from electrical audio signals. Typically, the pair of loudspeakers are fixedly mounted in a common enclosure and may be acoustically and mechanically in-phase. For example, the loudspeakers may be acoustically in-phase because they generate sound from a same audio signal, and the loudspeakers may be mechanically in-phase because the same audio signal drives respective diaphragms of the loudspeakers simultaneously in the same direction. The forces generated by the speakers may, however, induce vibration and buzz of various components in the electronic device. This in turn, may cause poor user experiences when playing music and other sound recordings.

SUMMARY

In some aspects, the disclosure is directed to a loudspeaker configuration having drivers that are offset relative to one another, and soft mounted (or otherwise decoupled) to the device enclosure for induced force reduction. As previously discussed, speaker generated force transmitted to system can induce vibration and buzz of various components in the system leading to poor user experience. One force reduction technique that has been attempted includes a stacked driver configuration for force cancelling. Such a configuration, however, may not be suitable when the speaker z-height is constrained in the system. In addition, an offset speaker configuration or a soft-mount configuration could be implemented to avoid z-height constraints, but each of these configurations alone has limitations in force reduction. For example, a speaker configuration in which the drivers are fixedly mounted to the system in a laterally offset arrangement may not be optimal for high frequency force reduction. On the other hand, a speaker configuration in which the drivers are instead soft mounted to the enclosure but are stacked or have a non-offset configuration may be broken in product drop test if the design target is to maintain force reduction at low frequencies. The limitations of each of these configurations alone therefore causes challenges. The instant disclosure therefore proposes a configuration that takes advantages of the offset and soft-mount configurations while overcoming their limitations and improving the force reduction performance across almost the entire frequency range of interest. The proposed approach can be potentially used for portable electronic devices and other devices, particularly in the case where the z-height of the speaker is constrained and stacked force cancelling cannot be used.

More specifically, one aspect is directed to a speaker assembly comprising: a first speaker comprising a first diaphragm and a first voice coil movably coupled to a first magnet assembly, wherein the first diaphragm faces a first direction, the first voice coil moves along a first axis in the first direction when driven by an audio signal and the first magnet assembly is coupled to a fixed structure by a first compliant mounting member; and a second speaker laterally offset from the first speaker and including a second diaphragm and a second voice coil movably coupled to a second magnet assembly, wherein the second diaphragm faces a second direction different from the first direction, the second voice coil moves along a second axis in the second direction when driven by an audio signal and the second magnet assembly is coupled to the fixed structure by a second compliant mounting member. In some aspects, the first speaker and the second speaker are coupled to the fixed structure independently of one another by the first compliant mounting member and the second compliant mounting member, respectively. In some aspects, the first compliant mounting member directly couples a yoke of the first magnet assembly to a first portion of the fixed structure, and the second compliant member directly couples a yoke of the second magnet assembly to a second portion of the fixed structure. In still further aspects, the first speaker is fixedly coupled to the second speaker. In some aspects, the first magnet assembly is mounted to the second magnet assembly to fixedly couple the first speaker to the second speaker. In still further aspects, the first compliant mounting member or the second compliant mounting member may include a leaf spring. In some aspects, the first compliant mounting member and the second compliant mounting member are operable to dampen a transmission of a force generated by the first speaker and the second speaker to the fixed structure. In still further aspects, a third speaker laterally offset from the first speaker and the second speaker, and including a third diaphragm and a third voice coil movably coupled to a third magnet assembly, wherein the third diaphragm faces the first direction, the third voice coil moves along the first axis in the first direction when driven by an audio signal. The third speaker may be fixedly coupled to the first speaker and the second speaker. In some aspects, the fixed structure comprises a speaker module or an electronic device housing.

In still further aspects, an electronic device including a housing having a first wall and a second wall; a first transducer including a first voice coil movably coupled to a first magnet assembly, wherein the first voice coil is operable to move along a first axis in a first direction and the first magnet assembly is coupled to the first wall by a first compliant mounting member; and a second transducer including a second voice coil and a second magnet assembly, wherein the second voice coil is operable to move along a second axis that is laterally offset from the first axis and in a second direction opposite to the first direction and the second magnet assembly is coupled to the second wall by a second compliant mounting member. In some aspects, the first magnet assembly and the second magnet assembly are decoupled from one another and independently coupled to the first wall and the second wall, respectively. In some aspects, the first compliant mounting member directly couples a yoke of the first magnet assembly to a first portion of the fixed structure, and the second compliant member directly couples a yoke of the second magnet assembly to a second portion of the fixed structure. In some aspects, the first transducer is rigidly coupled to the second transducer. In still further aspects, the first magnet assembly is mounted to the second magnet assembly to rigidly couple the first transducer to the second transducer. In some aspects, the first compliant mounting member or the second compliant mounting member comprises a leaf spring. In still further aspects, the first compliant mounting member and the second compliant mounting member are operable to dampen a transmission of a force generated by the first transducer and the second transducer to the fixed structure. In some aspects, a third transducer is laterally offset from the first transducer and the second transducer, and including a third diaphragm and a third voice coil movably coupled to a third magnet assembly, wherein the third diaphragm faces the first direction, the third voice coil moves along the first axis in the first direction when driven by an audio signal. The third transducer may be fixedly coupled to the first transducer and the second transducer. In some aspects, the first transducer or the second transducer is a speaker and the first voice coil or the second voice coil is driven to move along the first axis or the second axis by an audio signal.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figures 1, 2, 3:
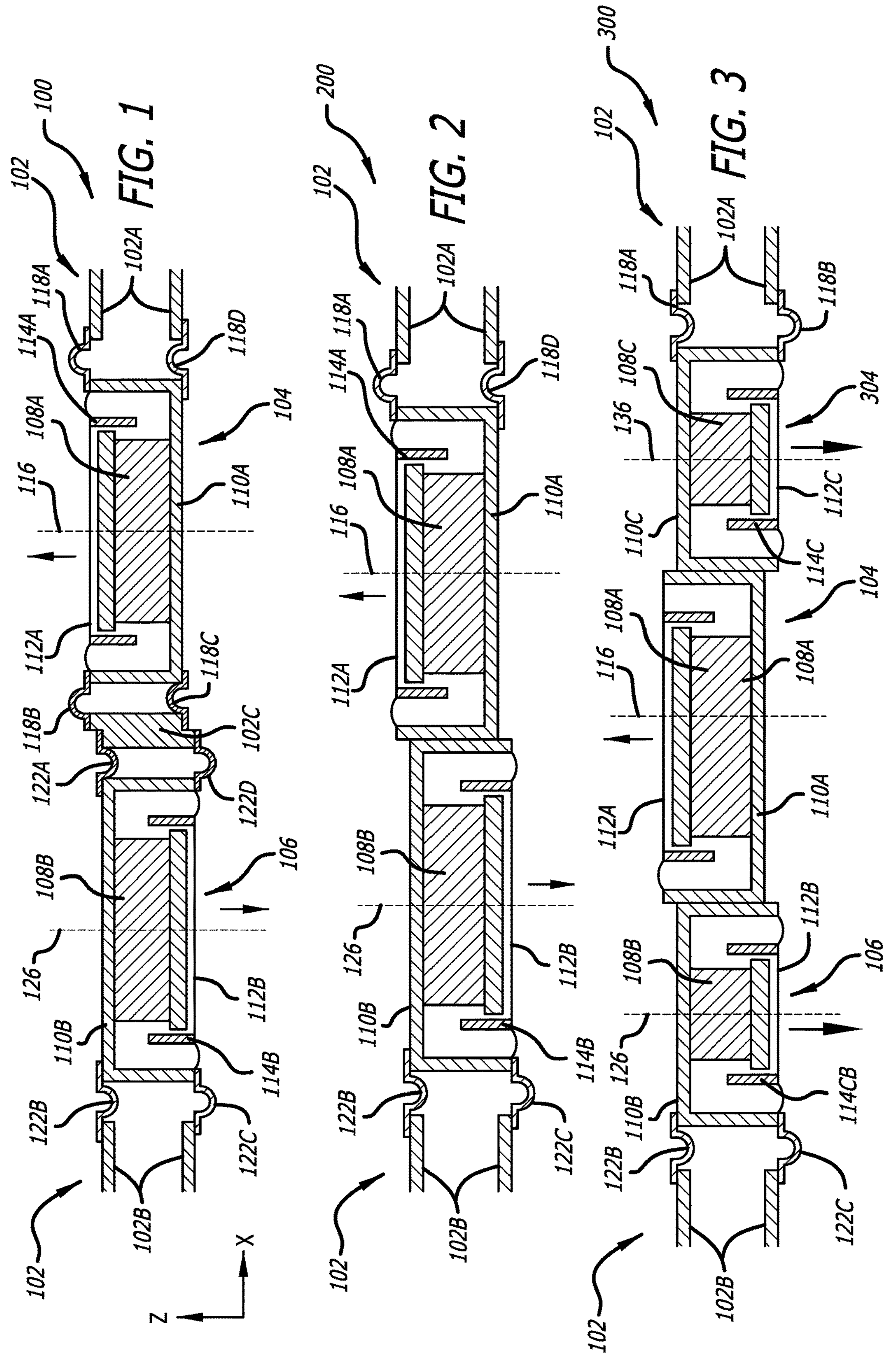
FIG. 1 illustrates a cross-sectional side view of one aspect of a transducer assembly.
FIG. 2 illustrates a cross-sectional side view of another aspect of a transducer assembly.
FIG. 3 illustrates a cross-sectional side view of another aspect of a transducer assembly.

FIG. 1 illustrates a cross-sectional side view of one aspect of a transducer assembly. Transducer assembly 100 may be, for example, an electro-acoustic transducer that converts electrical signals into an audible (or haptic) output that can be output from a device within which transducer assembly 100 is integrated. For example, transducer assembly 100 may be a micro-speaker such as an electrodynamic loudspeaker found within a smart phone, a laptop, notebook, tablet computer, portable time piece, or another electronic device. In other aspects, transducer assembly 100 may convert sound into an electrical audio signal, and may be referred to as a microphone. Transducer assembly 100 may be enclosed within a housing or enclosure of the device within which it is integrated, or a module which is integrated into the housing or enclosure of the device. In some aspects, transducer assembly 100 may be considered a micro-speaker, micro-transducer or micro-actuator that is relatively small (e.g., having a thickness of approximately 4 mm or less).

Transducer assembly 100 may include a frame, enclosure or housing 102, which may be a relatively rigid structure that supports and/or encloses some or all of the components of transducer assembly 100. In some aspects, housing 102 may support or enclose, or otherwise be coupled to, only the transducer components (e.g., a transducer module) or may enclose all the device components (e.g., a computer, portable device or other electronic device housing). Housing 102 may, in some cases, include first portion or walls 102A, a second portion or walls 102B and a third portion or walls 102C. In some aspects, the portions or walls 102A-C may form a cavity or interior chamber for holding transducer components is formed. In some aspects, portions or walls 102A-C may be considered fixed structures that can be snap-fit, welded, adhered or attached together using some other mechanism or process along their interfacing surfaces to form housing 102.

Transducer assembly 100 may further include transducers 104 and 106 coupled to housing 102. In some aspects, transducers 104, 106 may be any type of electroacoustic transducer capable of converting an electrical audio signal into a sound or a sound into an electrical audio signal. Representatively, transducers 104, 106 may be speakers or micro-speakers, for example, a miniaturized version of a loudspeaker that uses a moving coil motor to drive sound output. Thus, in some aspects, transducers 104, 106 may be referred to herein as micro-speakers. In other aspects, where transducers 104, 106 convert sound into an electrical audio signal, they may further be referred to herein as microphones. In this aspect, transducers 104, 106 may each include a magnet assembly having a magnet 108A, 108B mounted to a yoke 110A, 110B, respectively. Yokes 110A, 110B may surround a respective one of the magnets 108A, 108B such that together they form a magnetic gap. A vibrating surface or diaphragm 112A, 112B with a voice coil 114A, 114B attached thereto, respectively, is suspended over magnet assembly so that the voice coil 114A, 114B is positioned within the magnetic gap. Representatively, diaphragm 112A, 112B may include a compliant or flexible surround around the perimeter that attaches to the yoke 110A, 110B to movably suspend diaphragm 112A, 112B and voice coil 114A, 114B over the magnet assembly. In this aspect, the application of a current (or signal) though voice coil 114A, 114B produces a magnetic field which causes the voice coil 114A, 114B to react to the magnetic field of magnet 108A, 108B. This, in turn, moves voice coil 114A, 114B along the axis of vibration, which in turn causes diaphragm 112A, 112B to vibrate and output sound.

As previously discussed, however, the vibration of diaphragm 112A, 112B (and other transducer components) may unintentionally transmit a force to the system causing an undesirable system buzz affecting the user experience and/or mechanical failures from the vibration. To reduce these transmitted forces to the system, transducers 104, 106 may have an offset and decoupled mounting arrangement that operates to cancel some of these forces. Representatively, transducers 104, 106 may be arranged such that they are laterally offset along the x-axis and face different directions as shown. For example, transducer 104 is aligned with axis 116 while transducer 106 is aligned with axis 126. Axes 116, 126 may be parallel to the z-axis and laterally offset relative to the x-axis. Transducer 104 is further arranged so that a top side of diaphragm 112A faces a first direction (e.g., vertically upward direction along the z-axis) and vibrates or otherwise moves in a direction parallel to axis 116. For example, the top side of diaphragm 112A of transducer 104 may be a sound output side or surface that outputs sound to a user when diaphragm 112A vibrates along axis 116. Transducer 106, on the other hand, is arranged so that a top side (e.g., sound output side) of diaphragm 112B faces a second direction (e.g., vertically downward direction along the z-axis) and vibrates or otherwise moves in a direction parallel to axis 126. Axes 116 and 126 may therefore also be referred to herein as the axes of vibration. Diaphragm 112A of transducer 104 may be driven in an opposite direction than diaphragm 112B of transducer 106 (as illustrated by the arrows). This mechanically-out-of-phase arrangement of transducers 104, 106 can therefore cancel the undesirable forces that would otherwise be output to the system by the transducer vibrations.

In addition, to further prevent the output of undesirable forces generated by transducers 104, 106 to the system, transducers 104, 106 may be decoupled or soft mounted to the system housing 102. Decoupling or soft mounting transducers 104, 106 to housing 102 further helps reduce forces on the system by isolating or otherwise preventing the forces generated by transducer vibrations from being transferred to housing 102. It should further be understood that the term "soft" mount or "decoupled" is intended to refer to any sort of compliant or resilient mounting configuration that dampens, isolates or otherwise prevents or reduces a movement or force of transducer 104, 106 from being transmitted to the housing to which it is mounted. Representatively, in one aspect, transducer 104 is soft (or movably) mounted to housing 102 by compliant members 118A, 118B, 118C, 118D. Similarly, transducer 106 is soft (or movably) mounted to housing 102 by compliant members 122A, 122B, 122C, 122D. Transducer 104 and transducer 106 may be separately and/or independently soft mounted to housing 102 and can also be separately isolated from housing 102. In this aspect, transducer 104 may be considered decoupled from housing 102 and transducer 106. Similarly, transducer 106 may be considered decoupled from transducer 104 and housing 102.

Representatively, in some aspects, transducer 104 is soft mounted to housing walls 102A and 102C adjacent transducer 104 by compliant members 118A, 118B, 118C, 118D. For example, compliant member 118A may be mounted to, and extend laterally outward from, one side of the yoke 110A (e.g., a side forming the magnetic gap) of transducer 104 and extend to housing wall 102A and compliant member 118B may be mounted to, and extend laterally outward from, another side of yoke 110A (e.g., a side forming the magnetic gap) and extend to housing wall 102C to suspend the top side of transducer 104 from housing 102. The bottom side of transducer 104 may further be suspended from housing 102 by compliant members 118C and 118D which extend from the bottom side of yoke 110A to housing walls 102C, 102A, respectively. Transducer 106 is further soft mounted to housing walls 102B and 102C adjacent transducer 106 by compliant members 122A, 122B, 122C, 122D. For example, compliant member 122A may be mounted to one side of the yoke 110B of transducer 106 and extend laterally outward to housing wall 102C and compliant member 122B may be mounted to another side of yoke 110B and extend laterally outward to housing wall 102B to suspend the transducer 104 from housing 102. The other side of transducer 106 may further be suspended from housing 102 by compliant members 122C and 122D which extend from another side of yoke 110B to housing walls 102B, 102C, respectively. Compliant members 118A-118D and 122A-122D may be any type of structure or material that has compliant, resilient, force absorbent, dampening etc. properties that allow one part to move relative to another part and prevent forces generated by that movement from being transmitted to housing 102. For example, one or more of compliant members 118A-118D and 122A-122D may be a leaf spring or other type of spring capable of movably mounting the transducers to the housing and isolating any undesirable forces generated by the transducers. In other aspects, compliant members 118A-118D and 122A-122D may be a rubber, foam or component of another material capable of suspending transducers 104, 106 from housing 102 and reducing (or dampening) the transmission of transducer vibrations to housing 102.

It may further be recognized that, as previously discussed, a "soft" or "decoupled" mounting configuration may isolate forces well at higher frequencies but may not be as efficient at lower frequencies. On the other hand, the force reduction achieved by the offset arrangement may degrade at higher frequencies since the structural resonance of the housing can change the anti-symmetry of the dynamic forces generated by the transducers. The soft mounting of the transducers 104, 106 in combination with their offset arrangement, however, addresses these issues without having to, for example, tune a compliance of the mounting configuration to achieve force cancellation at more difficult ranges. In particular, the offset arrangement of transducers 104, 106 will provide force cancellation at frequencies that may be outside of a range ideal for force cancellation achieved by the soft mount of the transducers (e.g., frequencies lower than 600 Hz), while the decoupling or soft mount of transducers may provide force cancellation at higher frequencies not suitable for force cancellation due to the offset arrangement. For example, for higher frequencies (e.g., higher than the soft mount resonant frequency), the offset transducer arrangement may not achieve optimal force cancellation, the soft mount may therefore play the role for force cancelling at those frequencies, while the offset transducer arrangement provides the force cancellation at lower frequencies. In this aspect, the isolation resonance frequency can be several hundred Hertz higher than the original decoupled mount design. In addition, the degradation of offset arrangement at higher frequencies can be compensated by the high frequency isolation contribution of the soft mount or decoupling of transducers 104, 106. In this aspect, the combined soft mount (or decoupling) and offset arrangement of transducers 104, 106 achieves force cancellation across almost the entire frequency range of interest.

Referring now to FIG. 2, FIG. 2 illustrates a cross-sectional side view of another aspect of a transducer assembly. Transducer assembly 200 is substantially similar to, and includes substantially the same components as, transducer assembly 100 previously discussed in reference to FIG. 1. In this aspect, a description of the same components of assembly 100 found in assembly 200 that were previously discussed in reference to FIG. 1 are not repeated herein. In transducer assembly 200, however, transducer 104 and transducer 106 are fixedly mounted, or otherwise attached, to one another. The two transducers 104, 106 together are then decoupled from the housing 102 by a soft mount member. Representatively, one side of yoke 110A of transducer 104 is attached (e.g., by an adhesive, welding or the like) to one side of the yoke 110B of transducer 106 to form a single unitary or inseparable dual transducer structure. This single unit including transducer 104 and transducer 106 is then coupled to housing 102 by compliant members 118A, 118D, 122B, 122C, as previously discussed. For example, compliant members 118A, 118D may attach one side of transducer 104 to housing wall 102A, and compliant members 122B, 122C may attach another side of transducer 106 to housing wall 102B. In this aspect, the two transducers 104, 106 together are decoupled from housing 102 to achieve force cancelling using the offset and soft-mount arrangement as previously discussed.

Referring now to FIG. 3, FIG. 3 illustrates a cross-sectional side view of another aspect of a transducer assembly. Transducer assembly 300 is substantially similar to, and includes substantially the same components as, transducer assembly 200 previously discussed in reference to FIG. 2. In this aspect, a description of the same components of assembly 200 found in assembly 300 that were previously discussed in reference to FIG. 2 are not repeated herein. In transducer assembly 300, however, a third transducer 304 is offset from, and fixedly mounted to, transducer 104 and transducer 106. Representatively, transducer 304 may be laterally offset (e.g., along the x-axis) from transducers 104, 106 and arranged along axis 136. Similar to transducers 104, 106, transducer 304 may include a magnet assembly including yoke 110C and magnet 108C, and diaphragm 112C and voice coil 114C movably coupled to the magnet assembly. Transducer 304 may be fixedly coupled to transducer 104 by, for example, attaching yoke 110C of transducer 304 to yoke 110A of transducer 104. In addition, transducer 304 may face an opposite direction than transducer 104, and a same direction as transducer 106. Said another way, the diaphragm 112C of transducer 304 may face a same direction as diaphragm 112B of transducer 106 such that they both output sound in a same direction (as illustrated by the arrows). The three transducers 104, 106, 304 together are then decoupled from the housing 102 by a soft mount member. Representatively, compliant members 118A, 118D are attached to transducer 304 and housing wall 102A to attach one side of the three transducer module to housing 102, and compliant members 122B, 122C are attached to transducer 106 and housing wall 102B to attach the other side of the module to housing 102. In this aspect, the three transducers 104, 106, 304 together are decoupled from housing 102 to achieve force cancelling using the offset and soft-mount arrangement as previously discussed. It should further be understood that while up to three transducers are shown coupled together in an offset arrangement, more than three transducers may be coupled together and soft-mounted to housing 102 as desired.

Figure 4:
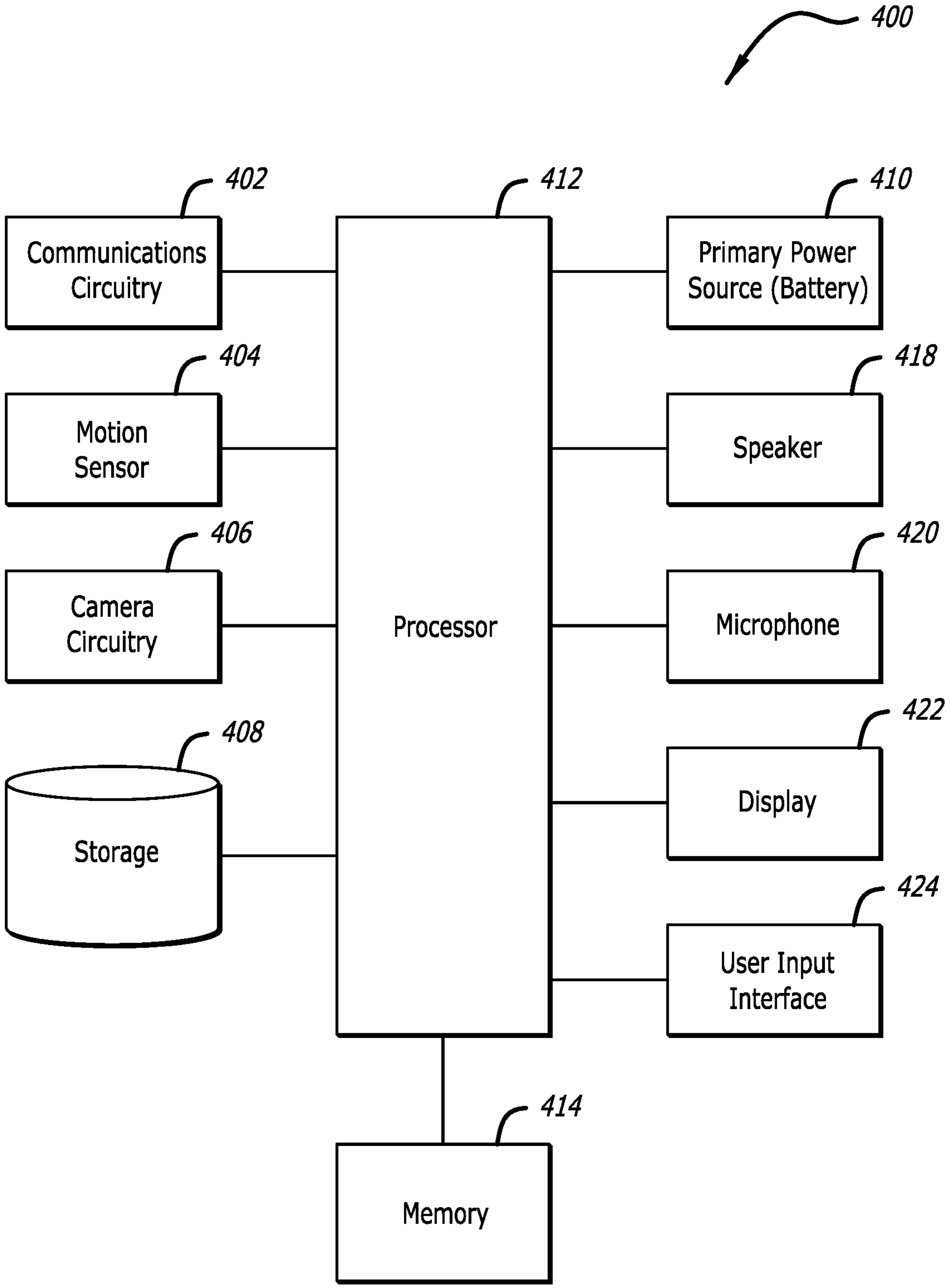
FIG. 4 illustrates a block diagram of some of the constituent components of an aspect of an electronic device in which one or more aspects may be implemented.

FIG. 4 illustrates a block diagram of some of the constituent components of an aspect of an electronic device in which one or more aspects may be implemented. Device 400 may be any one of several different types of consumer electronic devices. For example, device 400 may be any transducer-equipped device, such as a cellular phone, a smart phone, a media player, a tablet-like portable computer, a controller or any other device which may benefit from sound output.

In this aspect, electronic device 400 includes a processor 412 that interacts with camera circuitry 406, motion sensor 404, storage 408, memory 414, display 422, and user input interface 424. Main processor 412 may also interact with communications circuitry 402, primary power source 410, motion sensor 404, speaker 418 and microphone 420. The various components of the electronic device 400 may be digitally interconnected and used or managed by a software stack being executed by the processor 412. Many of the components shown or described here may be implemented as one or more dedicated hardware units and/or a programmed processor (software being executed by a processor, e.g., the processor 412).

The processor 412 controls the overall operation of the device 400 by performing some or all of the operations of one or more applications or operating system programs implemented on the device 400, by executing instructions for it (software code and data) that may be found in the storage 408. The processor 412 may, for example, drive the display 422 and receive user inputs through the user input interface 424 (which may be integrated with the display 422 as part of a single, touch sensitive display panel). In addition, processor 412 may send an audio signal to speaker 418 and/or motion sensor 404 to facilitate operation of speaker 418 and/or motion sensor 404.

Storage 408 provides a relatively large amount of "permanent" data storage, using nonvolatile solid state memory (e.g., flash storage) and/or a kinetic nonvolatile storage device (e.g., rotating magnetic disk drive). Storage 408 may include both local storage and storage space on a remote server. Storage 408 may store data as well as software components that control and manage, at a higher level, the different functions of the device 400.

In addition to storage 408, there may be memory 414, also referred to as main memory or program memory, which provides relatively fast access to stored code and data that is being executed by the processor 412. Memory 414 may include solid state random access memory (RAM), e.g., static RAM or dynamic RAM. There may be one or more processors, e.g., processor 412, that run or execute various software programs, modules, or sets of instructions (e.g., applications) that, while stored permanently in the storage 408, have been transferred to the memory 414 for execution, to perform the various functions described above.

The device 400 may include communications circuitry 402. Communications circuitry 402 may include components used for wired or wireless communications, such as two-way conversations and data transfers. For example, communications circuitry 402 may include RF communications circuitry that is coupled to an antenna, so that the user of the device 400 can place or receive a call through a wireless communications network. The RF communications circuitry may include a RF transceiver and a cellular baseband processor to enable the call through a cellular network. For example, communications circuitry 402 may include Wi-Fi communications circuitry so that the user of the device 400 may place or initiate a call using voice over Internet Protocol (VOIP) connection, transfer data through a wireless local area network.

The device 400 may include a microphone 420. Microphone 420 may be an acoustic-to-electric transducer or sensor that converts sound in air into an electrical signal. The microphone circuitry may be electrically connected to processor 412 and power source 410 to facilitate the microphone operation (e.g., tilting).

The device 400 may include a motion sensor 404, also referred to as an inertial sensor, that may be used to detect movement of the device 400. The motion sensor 404 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor 404 may be a light sensor that detects movement or absence of movement of the device 400, by detecting the intensity of ambient light or a sudden change in the intensity of ambient light. The motion sensor 404 generates a signal based on at least one of a position, orientation, and movement of the device 400. The signal may include the character of the motion, such as acceleration, velocity, direction, directional change, duration, amplitude, frequency, or any other characterization of movement. The processor 412 receives the sensor signal and controls one or more operations of the device 400 based in part on the sensor signal.

The device 400 also includes camera circuitry 406 that implements the digital camera functionality of the device 400. One or more solid state image sensors are built into the device 400, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 408. The camera circuitry 406 may also be used to capture video images of a scene. Device 400 also includes primary power source 410, such as a built in battery, as a primary power supply.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A speaker assembly comprising:

a first speaker comprising a first diaphragm and a first voice coil movably coupled to a first yoke of a first magnet assembly, wherein the first diaphragm faces a first direction, the first voice coil moves along a first axis in the first direction when driven by an audio signal and the first magnet assembly is coupled to a fixed structure by a pair of first compliant mounting members, the pair of first compliant mounting members having a top compliant mounting member having a first end coupled to a top portion of the first yoke and a second end coupled to a top portion of the fixed structure, and a bottom compliant mounting member having a first end coupled to a bottom portion of the first yoke and a second end coupled to a bottom portion of the fixed structure; and a second speaker laterally offset from, and fixedly coupled to, the first speaker, and the second speaker including a second diaphragm and a second voice coil movably coupled to a second yoke of a second magnet assembly, wherein the second diaphragm faces a second direction different from the first direction, the second voice coil moves along a second axis in the second direction when driven by an audio signal and the second magnet assembly is coupled to the fixed structure by a pair of second compliant mounting members, the pair of second compliant mounting members having a top compliant mounting member having a first end coupled to a top portion of the second yoke and a second end coupled to a top portion of the fixed structure, and a bottom compliant mounting member having a first end coupled to a bottom portion of the second yoke and a second end coupled to a bottom portion of the fixed structure.

2. The speaker assembly of claim 1 wherein the first speaker and the second speaker are coupled as a single unit to the fixed structure by the pair of first compliant mounting members and the pair of second compliant mounting members, respectively.

3. The speaker assembly of claim 1 wherein the first end of the top compliant mounting member of the pair of first compliant mounting members is directly coupled to the top portion of the fixed structure, and the second end of the top compliant mounting member of the pair of first compliant mounting members is directly coupled to the bottom portion of the fixed structure, and wherein the first end of the top compliant mounting member of the pair of second compliant mounting members is directly coupled to the top portion of the fixed structure, and the second end of the top compliant mounting member of the pair of second compliant mounting members is directly coupled to the bottom portion of the fixed structure.

4. The speaker assembly of claim 1 wherein the first magnet assembly of the first speaker is fixedly coupled to the second magnet assembly of the second speaker.

5. The speaker assembly of claim 4 wherein the first yoke of the first magnet assembly is mounted to the second yoke of the second magnet assembly to fixedly couple the first speaker to the second speaker.

6. The speaker assembly of claim 1 wherein at least one compliant mounting member of the pair of first compliant mounting members or the pair of second compliant mounting member comprises a leaf spring.

7. The speaker assembly of claim 1 wherein the pair of first compliant mounting members and the pair of second compliant mounting members are operable to dampen a transmission of a force generated by the first speaker and the second speaker to the fixed structure.

8. The speaker assembly of claim 1 further comprising a third speaker laterally offset from the first speaker and the second speaker, and including a third diaphragm and a third voice coil movably coupled to a third magnet assembly, wherein the third diaphragm faces the first direction, the third voice coil moves along the first axis in the first direction when driven by an audio signal.

9. The speaker assembly of claim 8 wherein the third speaker is fixedly coupled to the first speaker and the second speaker.

10. The speaker assembly of claim 1 wherein the fixed structure comprises a speaker module or an electronic device housing.

11. An electronic device comprising:

a housing having a first wall and a second wall;

a first transducer including a first voice coil movably coupled to a first magnet assembly, wherein the first voice coil is operable to move along a first axis in a first direction and the first magnet assembly is coupled to the first wall by a pair of first compliant mounting members, and wherein the pair of first compliant mounting members comprises a top compliant mounting member and a bottom compliant mounting member that directly couple a top portion of a yoke and a bottom portion of the yoke, respectively, of the first magnet assembly to a top portion and a bottom portion, respectively, of a fixed structure; and a second transducer fixedly coupled to the first transducer and including a second voice coil and a second magnet assembly, wherein the second voice coil is operable to move along a second axis that is laterally offset from the first axis and in a second direction opposite to the first direction and the second magnet assembly is coupled to the second wall by a pair of second compliant mounting members, and wherein the pair of second compliant mounting members comprises a top compliant mounting member and a bottom compliant mounting member that directly couple a top portion of a yoke and a bottom portion of the yoke, respectively, of the second magnet assembly to a top portion and a bottom portion, respectively, of the fixed structure.

12. The electronic device of claim 11 wherein the first magnet assembly and the second magnet assembly are coupled as a single unit to the first wall and the second wall, respectively.

13. The electronic device of claim 11 wherein the first magnet assembly of the first transducer is fixedly coupled to the second magnet assembly of the second transducer.

14. The electronic device of claim 13 wherein the yoke of the first magnet assembly is mounted to the yoke of the second magnet assembly to rigidly couple the first transducer to the second transducer.

15. The electronic device of claim 11 wherein at least one compliant mounting member of the pair of first compliant mounting members or the pair of second compliant mounting members comprises a leaf spring.

16. The electronic device of claim 11 wherein the pair of first compliant mounting members and the pair of the second compliant mounting members are operable to dampen a transmission of a force generated by the first transducer and the second transducer to a fixed structure.

17. The electronic device of claim 11 further comprising a third transducer laterally offset from the first transducer and the second transducer, and including a third diaphragm and a third voice coil movably coupled to a third magnet assembly, wherein the third diaphragm faces the first direction, the third voice coil moves along the first axis in the first direction when driven by an audio signal.

18. The electronic device of claim 17 wherein the third transducer is fixedly coupled to the first transducer and the second transducer.

19. The electronic device of claim 11 wherein the first transducer or the second transducer is a speaker and the first voice coil or the second voice coil is driven to move along the first axis or the second axis by an audio signal.

* * * * *